Nov. 18, 1930.     R. B. FAGEOL     1,781,898
SNUBBER
Original Filed Oct. 16, 1926    2 Sheets-Sheet 1
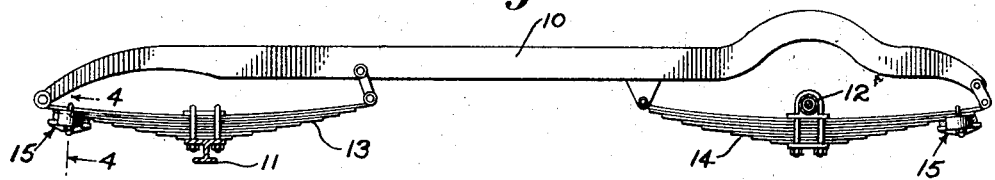
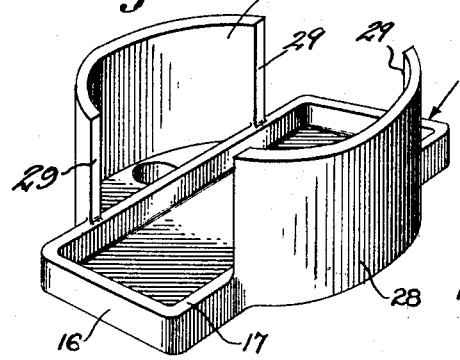
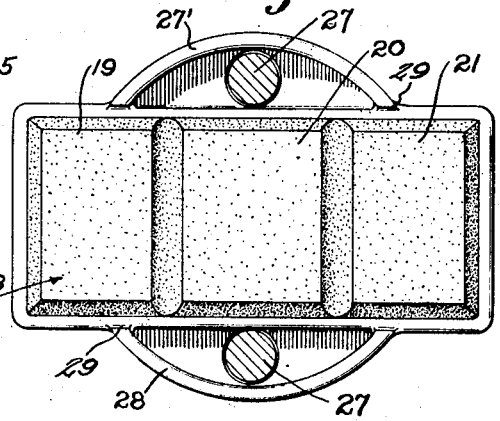
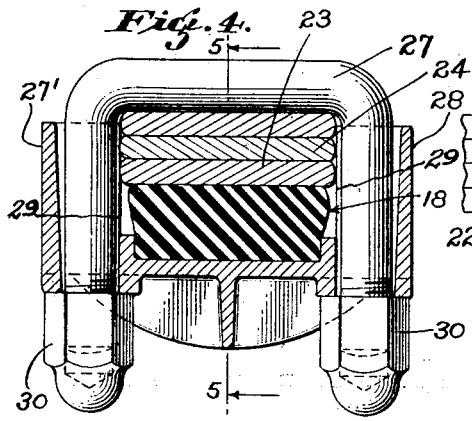
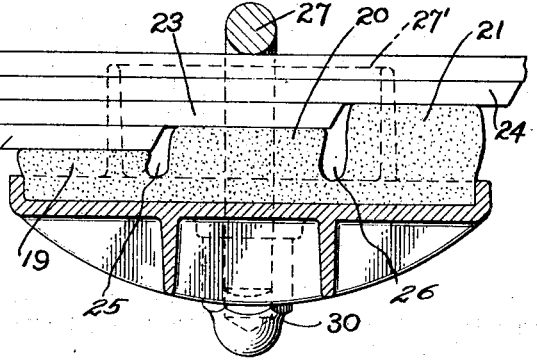
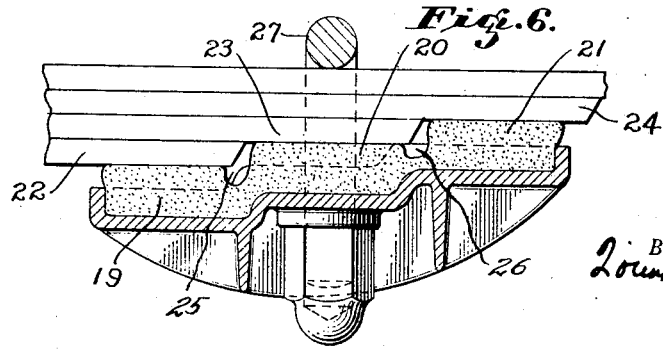
INVENTOR.
Rollie B. Fageol
BY
Townsend, Loftus & Abbett
ATTORNEYS.

Nov. 18, 1930.   R. B. FAGEOL   1,781,898
SNUBBER
Original Filed Oct. 16, 1926   2 Sheets-Sheet 2
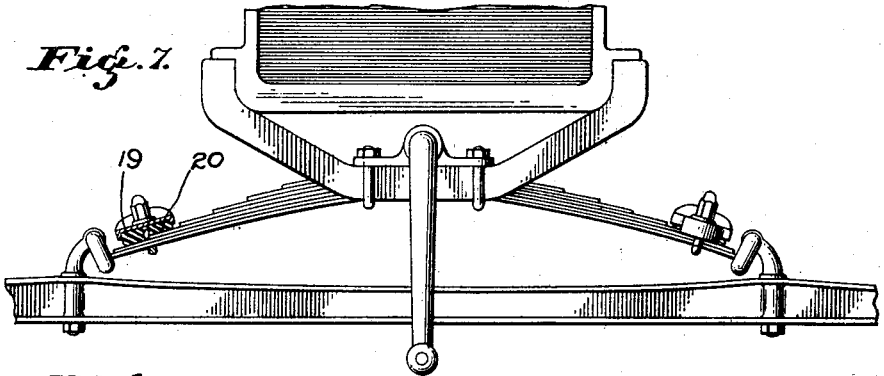
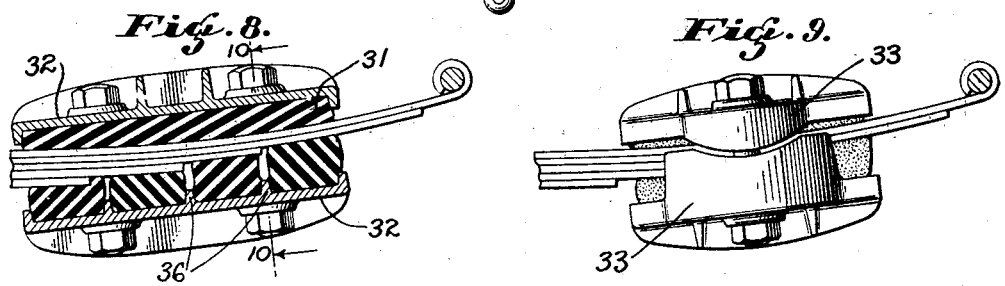
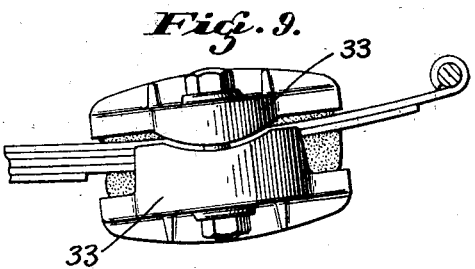
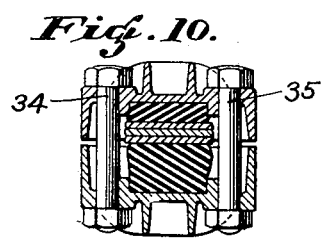
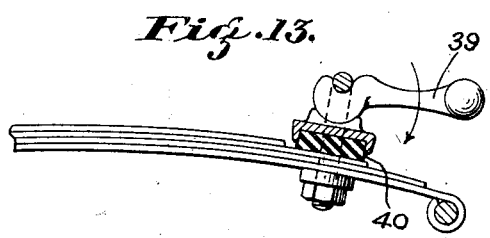
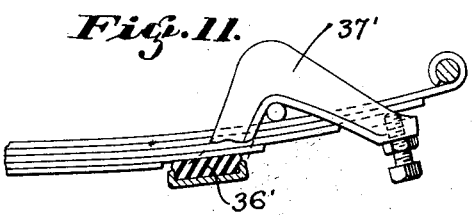
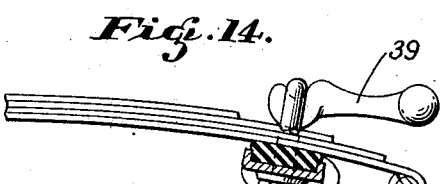
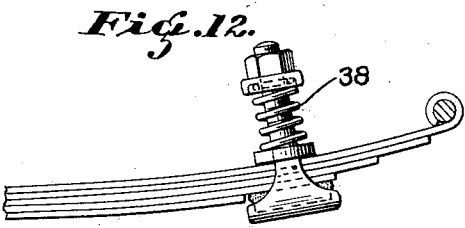
INVENTOR.
Rollie B. Fageol.
BY Townsend, Loftus & Hett
ATTORNEYS.

Patented Nov. 18, 1930

1,781,898

UNITED STATES PATENT OFFICE

ROLLIE B. FAGEOL, OF LOS ANGELES, CALIFORNIA

SNUBBER

Application filed October 16, 1926. Serial No. 141,924. Renewed October 21, 1929.

This invention relates to vehicle spring suspensions and particularly pertains to snubbers operating in conjunction with the vehicle springs. In the operation of vehicles and particularly automobiles in which it is common practise to support the frame upon the running gear by interposing spring therebetween, it has been found that when the wheels of the running gear suddenly strike irregularities in the contour of the roadway, the weight of the vehicle would tend to continue in its general direction of travel and will cause the springs upon which it is supported to be violently deflected. It is intended that the deflection of the springs will absorb the shock and that a minimum amount of it will be transferred to the frame. In operation, however, the deflection of the springs is followed by a rebound of the springs as they tend to restore themselves to a normal position, and this rebound imparts a violent force to the automobile frame and body. It is the principal object of the present invention to provide a vehicle shock absorber or snubber which will permit the downward deflection of the springs with substantial ease, but which will automatically build up resistance against the upward rebound of the springs in a manner to materially check this rebound and thus increase the riding qualities of the vehicle.

This resistance is built up by creating friction between the leaves of the spring, and by utilizing the tendency of an inherently yieldable block or pad to resist lateral deflection. The latter characteristic of a block or pad is utilized when such block or pad is adherently or non-slidably mounted on a spring leaf or leaves so that when the leaf or leaves tend to move endwise they are incapable of doing so without causing lateral deflection of the block. When such deflection is caused a yielding or cushioned resistance is imposed on the action of the springs, particularly on the rebound, and such block completely absorbs minor shocks and partially absorbs major shocks. This invention accordingly, aims both to restrict the freedom for relative movement of the spring leaves by setting up a yielding friction between them, but at the same time to utilize the means that causes the setting up of the yielding friction to absorb, in whole or in part, the shocks applied to the vehicle spring.

The present invention contemplates the application of means to the leaves of a multiple-leaf spring which will tend to create friction between the leaves, and will also offer yieldable resistance to the longitudinal movement of the leaves with relation to each other.

The present invention contemplates further the application of a pad or block of resilient material directly to a leaf or leaves of the spring so that the high coefficient of friction between such material and metal is made use of in preventing slipping of the spring leaf or leaves with respect to the resilient material, whereby when the leaf or leaves move the resilient material adjacent said leaf or leaves moves therewith to cause the shocks to be cushioned or absorbed in the body of the resilient material.

The invention is illustrated by way of example in the accompanying drawings, in which—

Figure 1 is a view in side elevation showing the vehicle frame equipped with semi-elliptical front and rear springs and further provided with the snubbers with which the present invention is concerned.

Figure 2 is an enlarged view in perspective showing the fitting of the snubber.

Figure 3 is an enlarged view in plan showing the snubber fitting with the resilient pad applied thereto and further disclosing the fastening bolt in section.

Figure 4 is an enlarged view in transverse section through the snubber as seen on the line 4—4 of Figure 1.

Figure 5 is a view in longitudinal section showing the snubber applied as viewed on the line 5—5 of Figure 4.

Figure 6 is a view in longitudinal section showing a modified form of the snubber structure.

Figure 7 is a view in front elevation disclosing the application of the present invention to vehicle springs of the Ford type.

Figure 8 is a view in longitudinal section through a form of the invention designed to be used with cars of heavy load capacity.

Figure 9 is a view in side elevation showing the structure of Figure 8, but embodying the use of a single clamping bolt on each side of the spring.

Figure 10 is a view in transverse section on line 10—10 through the structure shown in Figure 8.

Figure 11 is a view in section and side elevation showing the application of the resilient pad to another form of snubber.

Figure 12 is a view in side elevation showing the application of the resilient pad to a compression spring form of snubber.

Figures 13 and 14 are views in section and side elevation showing the application of the resilient pad to gravity operated shock absorbers.

Referring more particularly to the drawings:

10 indicates a vehicle main frame here indicated as being supported upon a front axle 11 and a rear axle 12. A front semi-elliptical spring 13 is interposed between the front axle 12 and the main frame while a rear semi-elliptical spring 14 is here shown as interposed between the rear axle and the frame.

It will be understood, however, that the present invention is not limited to the use of semi-elliptical springs, but that other multiple-leaf springs may be used if desired. The present invention is intended to create friction between the leaves of a multiple-leaf spring and to yieldingly resist longitudinal movement of the leaves. One form of the structure for accomplishing this result is shown in Figures 1 to 10 of the drawings, while modified forms are shown in Figures 11 to 14, inclusive.

Referring particularly to Figures 1 to 10, inclusive, it will be seen that a fitting 15 is provided. This fitting comprises a base plate 16 which is bounded along its marginal edges by an up-turned flange 17, thus forming a rectangular pocket into which a resilient pad 18 may be seated. The resilient pad is formed with a plurality of steps or block portions. The number of these steps may be varied to suit requirement. However, in Figures 3 and 6 these steps are indicated as being three in number and are indicated by the reference numerals 19, 20 and 21. In Figure 7 of the drawing there are only two steps of the resilient pad shown indicated by the numerals 19 and 20.

This pad is preferably made of rubber which has considerable resilience. The steps or separate blocks 19, 20 and 21 vary in height in direct proportion to the variation in the thicknesses of the leaves of the spring. By particular reference to Figures 5 and 6 it will therefore be seen that the lower step will engage the spring leaf 22, the next succeeding step will engage the ovehanging spring leaf 23, and the block 21 will engage the next succeeding overhanging leaf 24.

For reasons which will be hereinafter set forth, the blocks of the pad are united along their base portions and are separated above the base plate as indicated at 25 and 26. The plate 16 with pad 18 seated thereupon is clamped against the graduated overlapping faces of the spring leaves by a U-bolt 27 as shown in Figures 4, 5, 6 and 7 of the drawings, while other clamping means are provided for the form shown in Figure 8 of the drawings. In any event, the clamp structure embraces the spring and places the blocks of the resilient pad under uniform compression so that they will exert a constant pressure against the respective spring leaves and will create a definite sliding friction between the leaves when the leaves slide longitudinally relative to each other during deflection. The shifting movement of the individual leaves is also resisted when the leaves are deflected, due to the frictional engagement of the resilient blocks with the under faces of the leaves and in a manner to make it necessary for the leaves to distort the blocks and to move against this resistance. The fitting 15 is held in place and prevented from laterally shifting on the springs by means of side guides 27' and 28. These guides are here shown as being segments of a circle and as serving the dual purpose of centering the snubber upon the spring and also neatly concealing the U-bolt 27 which extends downwardly along opposite sides of the spring and through the base of the fitting 15. By reference to Figure 4 of the drawing it will be seen that the vertical edges 29 of the guides 27' and 28 extend parallel to each other and along opposite sides of the spring leaves where they are held when the U-bolts are clamped in position. The U-bolts are preferably fitted with relatively long acorn nuts 30 which are threaded a sufficient distance to permit considerable take-up to be had when adjustment is required. It will also be understood that the fitting 15 is suitably webbed and braced so that there will not be any breaking strain imposed upon the fitting by the tension of the tightened U-bolt or other action incident to the operation of the springs. In the form of the invention shown in Figure 6 of the drawing, the base plate 16 is stepped correspondingly with the variation in height of the faces of the resilient blocks and in this manner some of the resilient material is conserved.

By referring to Figure 7 of the drawing, it will be seen that a snubber is provided of relatively short dimension, since in application upon the Ford type of car it is only necessary to act against two springs. It will be found apparent that since the graduated springs are reversed in position as compared with the multiple-leaf springs shown in Figure 1 of the drawing, the snubber will of necessity be reversed and will be placed upon the top of the spring.

In the use of the present invention with springs designed for heavy duty, it has been found desirable to create a yieldable pressure upon opposite sides of the spring. For that reason, an auxiliary resilient pad 31 is mounted upon the upper long-leaf of the spring and is held in position by a clamping plate 32. This plate is formed with overhanging side members 33 agreeing substantially in form and demensions with the members 27' and 28 of the lower fitting and serving the same purpose in that the fitting and plate will be held against lateral twisting movement. By the use of the fitting 15 and the plate 32 it is possible to eliminate the U-bolt 27 and to provide a pair of straight bolts 34 and 35, which pass down through the members and along opposite sides of the spring. Attention is further directed to the fact that if desired the blocks may be completely separated and spaced apart by webs 36 formed in the fitting 15.

In the form of the invention shown in Figure 11, a resilient block 36' is disclosed as being interposed between one arm of a clamp member 37' and the face of a spring leaf. This clamping device is mounted upon the spring in a manner to create frictional contact between two of the leaves. In the structure shown in Figure 12 substantially the same thing is true with the addition that a resilient spring 38 is clamped against the leaf on one side and holds a block of resilient springs against one of the leaves on the opposite side of the spring. Figures 13 and 14 show a modification of the invention in which a gravity operated pendulum member 39 swings downwardly on rebound in the car to create friction between the leaves, and this member co-operates with the resilient block 40 designed to increasingly resist the shifting movement of the leaves on rebound of the springs.

In operation of the present invention, the snubber is applied to the spring in a manner best suited to the design of the spring and the load intended to be carried thereby. It has been found in practise that it is desirable to place the snubber on the outer halves of the springs extending from the axles to the spring horns and it has also been found desirable to place the snubber of the front springs at a point closer to the ends of the springs than the snubbers are placed on the rear springs. It will thus be apparent that experiment has proven that variation in action may be obtained by varying the relative positions of the snubbers in their application upon the springs. In the form of the invention shown in Figures 1 to 10, inclusive, the faces on the spring leaves against which the resilient blocks are to bear are first thoroughly cleaned so that the flat surfaces of the blocks will rest firmly thereagainst, after which the snubbers are applied and clamped to a desired tension by the U-bolts 27 or the bolts 34 and 35. In practise it is found that after the spring blocks have been thus clamped against the face of the springs, they will frictionally engage the same and normal operation of the spring will not cause any relative movement between the faces of the spring blocks and the spring leaves against which they are clamped. It is to be understood that the bolts create a desired compression of the resilient blocks which will of necessity slightly deform the blocks as indicated in Figure 5 of the drawing. By this constant yielding pressure, the springs against which the resilient blocks rest, as well as all of the springs embraced by the U-bolts or the plate and bolts of Figure 10, will be clamped together in a mass which will permit them to slide relative to each other during deflection of the spring, but against frictional resistance caused by the resilient blocks bearing thereagainst. When a spring is deflected, therefore, on the down stroke, the weight of the car will overcome the friction existing between leaves and will cause the spring to readily deflect under the shock of impact. When, however, the rebound of the spring takes place, the action will not be accompanied by such violent force as on the down stroke and the friction between the spring leaves as caused by the resilient block will tend to retard the rebound of the spring and cause it to return to its normal position with a minimum shock to the frame.

Attention is also directed to the fact that when any shifting movement takes place between the leaves against which the blocks bear, the upwardly projecting and separated portions of the blocks will be distorted and shifted in the direction of movement of the leaves. This distortion must be brought about in a mass of rubber which is under compression and due to the fact that the contacting faces of the leaves and the resilient blocks have negligible movement with relation to each other, it will be evident that any force to distort and shift the resilient blocks will be resisted by the compression of the blocks themselves. In this manner the resilient blocks will form the double purpose of creating yieldable friction between the spring leaves and also resisting the individual shifting movement of the separate leaves.

In the forms of the invention shown in Figures 11 to 14, inclusive, the same result is obtained from the use of the resilient block as was obtained in the other forms of the invention shown in the drawings.

It will thus be seen that the device here disclosed provides a simple structure adapted to be mounted upon the multiple leaves of vehicle springs without alteration or replacement of parts, and which will act to create a positive and desirable resistance to spring rebound, thereby increasing the riding qualities of the car and eliminating objectionable vibration which would otherwise be imparted to the parts of the vehicle structure.

While I have shown the preferred form of my invention, as now known to me, it will be understood that various changes may be made in the combination, construction and arrangement of the parts by those skilled in the art without departing from the spirit of the invention as claimed.

Having thus described my invention, what I claim and desire to secure by Letters Patent is—

1. In combination with a multi-leaf spring, a plurality of resilient members separately bearing against the exposed overlapping faces of the spring leaves, and means for clamping said members against said exposed faces whereby yieldable friction will be produced between the contacting faces of the several leaves.

2. In combination with a multi-leaf spring, a plurality of resilient members separately bearing against the exposed overlapping faces of the spring leaves, and means for clamping said members against said exposed faces whereby longitudinal movement of the leaves with relation to each other will be resisted.

3. In combination with a multi-leaf spring, a plurality of resilient members separately bearing against the exposed overlapping faces of the spring leaves, and means for clamping said members against said exposed faces whereby yieldable friction will be produced between the contacting faces of the several leaves and whereby longitudinal movement of the leaves with relation to each other will be resisted.

4. In combination with a multi-leaf vehicle spring, a resilient pad having a united base portion and a plurality of blocks projecting therefrom of graduated length, said blocks being formed with flat faces to contact against successive overlapping exposed faces of the vehicle spring leaves, a plate disposed beneath the pad, and means embracing the spring and securing the faces of the block against the spring leaves.

5. In combination with a multi-leaf vehicle spring, a resilient pad having a united base portion and a plurality of blocks projecting therefrom of graduated length, said blocks being formed with flat faces to contact against successive overlapping exposed faces of the vehicle spring leaves, a plate disposed beneath the pad, means embracing the spring and securing the faces of the block against the spring leaves, and means forming a part of the plate for centering the plate upon the spring and for preventing lateral or twisting movement thereof.

6. In combination with a multi-leaf vehicle spring, yieldable means comprising a pad bearing firmly upon a substantial portion of a plurality of leaves and means to clamp said leaves and pad together.

7. In combination with a multi-leaf vehicle spring, means bearing firmly upon a substantial portion of a plurality of leaves for individually resisting longitudinal movement of the separate spring leaves.

8. In combination with a multi-leaf vehicle spring, means embracing a plurality of leaves for individually clamping them one against the other, and means bearing upon a substantial portion and interposed between the individual leaves and the clamping means for creating yieldable friction between adjacent leaves.

9. In combination with a multi-leaf vehicle spring, means embracing a plurality of leaves for individually clamping them one against the other, and means having relatively large bearing surfaces interposed between the individual leaves and the clamping means for creating yieldable friction between adjacent leaves and for yieldably resisting longitudinal movement of the individual leaves.

10. In combination with a multi-leaf vehicle spring, means embracing a plurality of leaves for individually clamping them one against the other, and means having a plurality of separated relatively wide bearing surfaces interposed between the separate leaves and the clamping means for individually resisting longitudinal movement of the leaves.

11. In combination with a vehicle spring having a plurality of leaves arranged in juxtaposition, adjustable clamping means embracing certain of said leaves, and resilient means between said clamping means and said spring and directly contacting with the latter to cushion the action of said spring.

12. In combination with a vehicle spring having a plurality of leaves arranged in juxtaposition, adjustable clamping means embracing certain of said leaves, and a pad of resilient material between said clamping means and said spring non-slidably contacting therewith whereby said pad will cushion the action of said spring.

13. In combination with a vehicle spring having a plurality of leaves of varying length arranged in juxtaposition, adjustable clamping means embracing certain of said leaves, and resilient means disposed between said clamping means and said spring and contacting the exposed ends of a plurality of leaves, whereby yielding pressure may be variably applied to said last named leaves.

14. In combination with a vehicle spring having a plurality of leaves of varying length arranged in juxtaposition, adjustable clamping means embracing certain of said leaves, and a resilient pad arranged between said means and the exposed ends of a plurality of leaves and non-slidably engaging said leaves whereby longitudinal movement of said leaves is cushioned by said pad.

15. In combination with a vehicle spring having a plurality of leaves of varying length arranged in juxtaposition, of a pad of resilient material directly and non-slidably contacting with a portion of said spring whereby action of said spring is cushioned by said resilient material, and means to maintain said pad firmly in contact with said spring.

16. In combination with a vehicle spring having a plurality of leaves of varying length arranged in juxtaposition, of a pad of rubber directly and non-slidably contacting with a substantial portion of said spring so that the action of said spring is cushioned by the rubber of said pad, and means to maintain said pad firmly in contact with said spring.

17. A snubber for a multi-leaf vehicle spring comprising a plurality of resiliently yieldable sections of material, each section being of substantial area and adapted to firmly engage a different spring leaf to yieldingly and variably resist relative longitudinal movement between the spring leaves.

18. A snubber for multi-leaf vehicle springs comprising a resilient block having surfaces adapted to contact directly with a plurality of spring leaves, means to hold said block in firm contact with said leaves whereby relative longitudinal movement between the leaves is yieldingly resisted.

19. A snubber for multi-leaf vehicle springs, comprising a resilient block shaped to engage a plurality of spring leaves over a substantial area of each of said leaves, said block being substantially resilient in a plurality of directions, and means to firmly press said block into direct contact with said leaves.

20. A snubber for a multiple leaf vehicle spring embodying a plurality of leaves of varying lengths, the shorter leaves being relatively free at their ends comprising resilient means contacting adjacent the relatively free ends of a plurality of the shorter leaves, and means surrounding said leaves and a longer leaf to clamp said resilient means against said shorter leaves.

ROLLIE B. FAGEOL.